(12) United States Patent
Tolpin

(10) Patent No.: US 11,797,675 B2
(45) Date of Patent: Oct. 24, 2023

(54) SYSTEM AND METHOD FOR MALWARE DETECTION

(71) Applicant: PayPal, Inc., San Jose, CA (US)

(72) Inventor: David Tolpin, Ashdod (IL)

(73) Assignee: PayPal, Inc., San Jose, CA (US)

( * ) Notice: Subject to any disclaimer, the term of this patent is extended or adjusted under 35 U.S.C. 154(b) by 72 days.

(21) Appl. No.: 17/397,898

(22) Filed: Aug. 9, 2021

(65) Prior Publication Data
US 2021/0365949 A1 Nov. 25, 2021

Related U.S. Application Data

(63) Continuation of application No. 16/889,750, filed on Jun. 1, 2020, now Pat. No. 11,087,330, which is a continuation-in-part of application No. 15/636,917, filed on Jun. 29, 2017, now abandoned.

(51) Int. Cl.
| | |
|---|---|
| *G06F 21/56* | (2013.01) |
| *G06Q 20/40* | (2012.01) |
| *G06N 5/04* | (2023.01) |
| *G06Q 20/38* | (2012.01) |
| *G06F 18/22* | (2023.01) |
| *G06N 7/01* | (2023.01) |

(52) U.S. Cl.
CPC ............ *G06F 21/566* (2013.01); *G06F 18/22* (2023.01); *G06N 5/04* (2013.01); *G06N 7/01* (2023.01); *G06Q 20/389* (2013.01); *G06Q 20/4016* (2013.01)

(58) Field of Classification Search
CPC .................................................... G06F 21/566
See application file for complete search history.

(56) References Cited

U.S. PATENT DOCUMENTS

| | | | |
|---|---|---|---|
| 2005/0203881 A1 | 9/2005 | Sakamoto et al. | |
| 2011/0208585 A1 | 8/2011 | Daboll et al. | |
| 2014/0052527 A1 | 2/2014 | Roundtree | |
| 2014/0142862 A1 | 5/2014 | Umeno et al. | |
| 2015/0039388 A1 | 2/2015 | Rajaraman | |
| 2015/0073759 A1 | 3/2015 | Vepakomma et al. | |
| 2015/0088662 A1 | 3/2015 | Noller et al. | |
| 2015/0101050 A1* | 4/2015 | Nielson ................. | G06F 21/552 726/23 |
| 2015/0269577 A1 | 9/2015 | Avegliano et al. | |
| 2015/0333913 A1* | 11/2015 | Dayka ................... | H04L 9/3247 713/176 |
| 2016/0042282 A1 | 2/2016 | Amini | |
| 2016/0182543 A1* | 6/2016 | Aabye ..................... | G06F 21/88 726/5 |

(Continued)

OTHER PUBLICATIONS

Wood F., et al., "A New Approach to Probabilistic Programming Inference," Proceedings of the 17th International Conference on Artificial Intelligence and Statistics(AISTATS), 2014, vol. 33, 9 pages.

*Primary Examiner* — Scott C Anderson
(74) *Attorney, Agent, or Firm* — HAYNES AND BOONE, LLP

(57) ABSTRACT

Aspects of the present disclosure involve a system and method for malware detection. The system and method introduce a probabilistic model that can observe user transaction data over a predetermined window of time. Then, using posterior probability, the system can determine whether multiple users where present during the window observed.

20 Claims, 7 Drawing Sheets

(56) References Cited

U.S. PATENT DOCUMENTS

| | | | |
|---|---|---|---|
| 2017/0187751 A1* | 6/2017 | Andrews | H04L 67/51 |
| 2017/0255753 A1 | 9/2017 | Jarrett et al. | |
| 2017/0270528 A1* | 9/2017 | Prakash | G06Q 20/3224 |
| 2017/0364570 A1* | 12/2017 | Jacob | G06F 16/258 |
| 2018/0060885 A1 | 3/2018 | Elmachtoub et al. | |

* cited by examiner

SYSTEM AND METHOD FOR MALWARE DETECTION

PRIORITY INFORMATION

The present application is a continuation of U.S. patent application Ser. No. 16/889,750, filed on Jun. 1, 2020 and issued as U.S. Pat. No. 11,087,330 on Jul. 21, 2021 and a continuation-in-part (CIP) application of U.S. patent application Ser. No. 15/636,917, filed on Jun. 29, 2017, entitled "System and Method for Malware Detection", the disclosures of which is hereby incorporated by reference in their entirety.

TECHNICAL FIELD

The present disclosure generally relates to Malware detection in communication devices, and more specifically, to Malware account take over detection in communication devices.

BACKGROUND

Nowadays with the evolution and proliferation of devices, users are constantly connected to the internet, frequenting websites, searching for products, streaming videos, etc. In view of such evolution, devices are now more than ever susceptible to a Malware driven attacks. These attacks can corrupt the device, damage data, and in some instances even take over a user's account. For example, in an account take over (ATO), the attacker can send payments by manually interacting with a payment provider (e.g., PayPal) through a user interface on the device. As another example, the attacker can use a malware program which automates fully or partially, the process of sending payments. Therefore, such ATOs can result in loss of time, money as well as stress and frustration to a user. Thus, it would be beneficial to create a system for Malware ATO detection.

Figure 1:
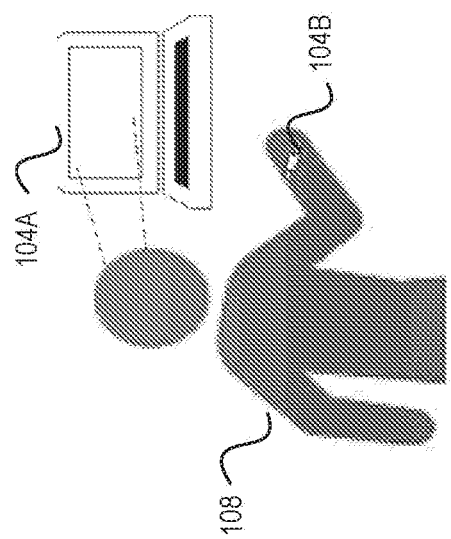
FIG. 1 illustrates a graphical diagram of an account take over.
Figure 1:
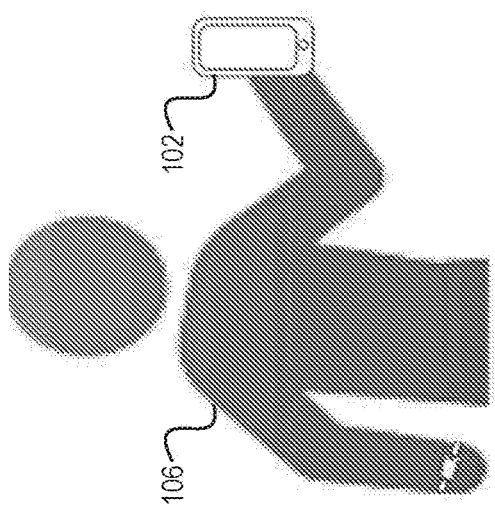

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for malware detection. In one embodiment, a system is introduced that uses a user's past transaction history to determine the posterior probability of account takeover. In particular, a user's transactional history is analyzed, windowed subsequences of the transaction log are defined, and then analyzed using probabilistic analysis to determine if a secondary user acted on the windowed log.

Conventionally, malware detection methods and systems use machine learning algorithms and/or user crafted rules. However, such detection methods can often be limited to user crafted rules or use shallow machine learning algorithms that may only be directed toward identifying single user suspicious transactions. In addition, these current methods fail to take into account user behavior or even the identification of multiple users. That is to say, current methods are limited to a single user acting on an account and generally do not consider the possibility of multiple users acting on the account and/or use historical user information for making smart malware detection decisions.

Figure I illustrates a graphical diagram of an account take over. In particular, Figure I illustrates user 106 involved with a device 102 (e.g., a laptop, computer, smart phone) actively engaged in the content on the display. The user 102 may be logged into a digital wallet, bank account, user account, payment provider account, and/or other similar account. While logged in, the user 106 may access the account to complete a transaction for the purchase of a good or service. Concurrently, a secondary user 108 may maliciously intrude into the account of user 106 using a secondary device 104. Secondary device 104 may be a computer 104, smart phone, wearable device 104B, tablet, virtual reality equipment, etc. The secondary user 104 may then proceed to invade the user's device 102 with malicious software such as malware. In the invasion, the secondary user may contaminate and damage the device and/or access the user account as an account take over. During the account take over, the secondary user 108, can send payments by manually interacting with the account provider (e.g., PayPal) through the user 102 interface. Additionally or alternatively, the secondary user 104 may use a malware program which can automate (fully or partially) the sending of payments from the account the secondary user 104 invaded. In some instances, the secondary user 108 may involuntarily access to the user account while in other instances, the secondary user 108 may voluntarily and maliciously access the user account.

Note that Figure I is used for exemplifying a user 106 accessing an account on a smart device 102 and a secondary user 108 simultaneously access the user's account via secondary device 104, however the embodiment is not so limited. For example, the user 106 may be at a merchant location accessing the account while a secondary user 108 access the account in a remote location and even in a different country.

Empirical evidence exists that an attack which uses a malware program to automate payments, may be identified post factum by looking at the times and amounts of payments. Justifications for being able to identify evidence of malware stem from the point that a malware program has a limited time to act before it is detected and the point that the algorithm involved in executing the payments produces a different temporal pattern than that of the regular user. Therefore, taking this into account, it is feasible to identify a method and system for identifying malware cases. Benefits from identifying malware cases based on transactions are achieved through I) the generation of labels for historical data, such that future account take overs can be predicted using machine learning techniques on login and session level data before they take place, and 2) in the assistance in the investigation and remediation of ATOs which are not prevented.

In line with the knowledge that malicious activity looks differently from regular activity, a first embodiment is presented where an estimate of the posterior probability is determined from a given transaction log window, that there are two rather than a single user given the past history and a priori probability of malware attack.

Figure 2:
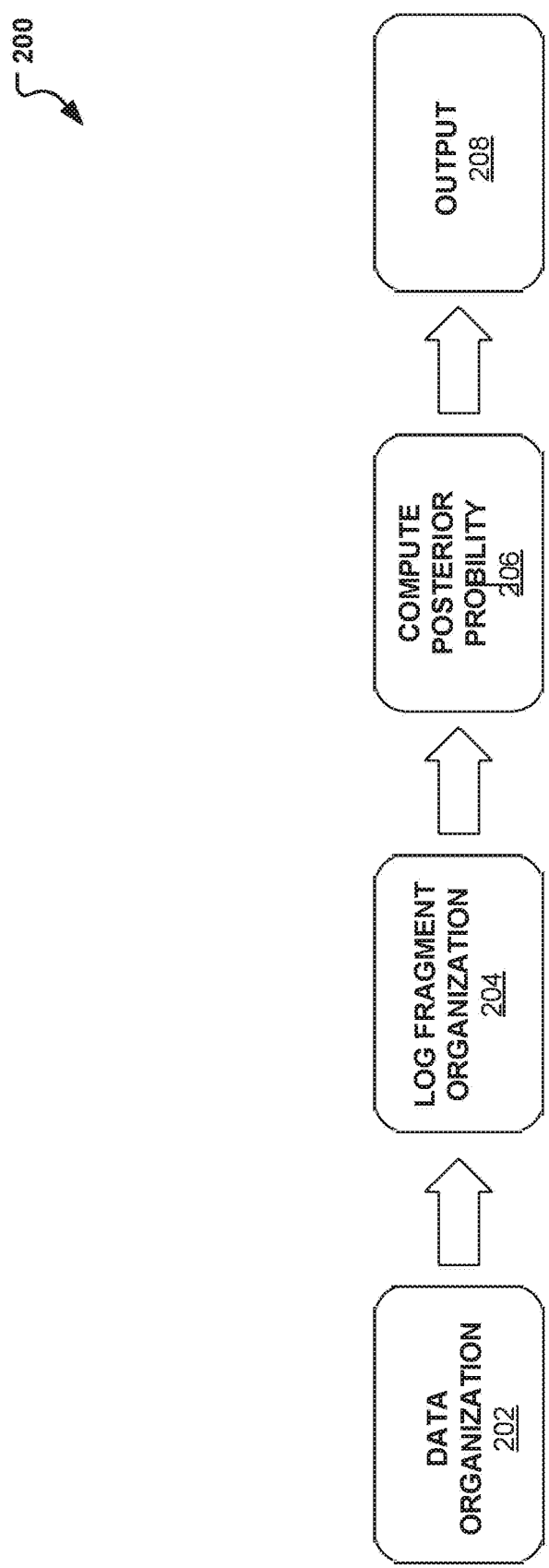
FIG. 2 illustrates a block diagram of a system for the overall process in detecting malware account take over.

For example, FIG. 2 illustrates a block diagram of a system for the overall methodology in malware detection. In particular, FIG. 2 illustrates a block diagram of a methodology 200 for determining a posterior probability that multiple users acted on a window of time in a user's transaction log. Further, methodology 200 presents a probabilistic model that explains how offline parameter estimation and online interference are performed (e.g., through use and simulation with ~1400 accounts with malicious transactions) for used the identification of malware-driven ATOs.

The methodology 200 for malware detection begins with the data organization 202 from a user's log. As indicated, historical data (e.g., transaction logs) can be used to obtain historical information regarding the times and amounts transacted by a user as well as help identify variations in user transactions. To detect the possibility that a secondary user 108 (malicious user) was present during a transaction, (e.g., user experience account take over) a system and method is introduced for the detection of one. As indicate, malware detection methodology 200 begins with the data organization 202, where the user's transaction log can be analyzed to obtain models for the user 106 and a possible secondary user 108.

In one instance, the user's data can be expressed by the transactional logs which can be examined and modeled as a sequence of pairs such that transaction log L includes $$L=(t_i, a_i),$$

where ti is time and ai is the amount of the ith transaction.

In one embodiment, a user 106 is modeled as a point process PP marked by transaction amounts drawn from distribution D:

$$t_i\ PP, a_i\ D$$

Similarly, a secondary user 108 is modeled as a point process PP marked by transaction amounts drawn from a distribution D.

Note that in some instances, a different distribution and point process may be used for a user 106 and a secondary user 108. This can occur because a larger amount of information can be obtained from a user's past history whereas, the information about a malicious user (secondary user 108) is more limited. Therefore, with the larger amount of information on the user 108, a richer probabilistic model may be used in the analysis.

For example, a user 106 may be modeled using a Hawkes process, with an exponential decay while the secondary user 108 may be modeled using a Poisson process. A Hawkes process is an interacting point process model used for modeling the intensity of data. In particular, it can be a class of multi-variant processes which can be characterized by a stochastic intensity vector. In addition, a probability distribution can be used for the monetary amounts in the model. A Gamma distribution is a convenient continuous probability distribution which uses two parameters. For example, the Gamma distribution can be parameterized by shape and rate (or by shape and scale—where scale is the inverse rate or amount and time). Note that other probability distributions may be used for the amounts in this model and is not limited to the use of a gamma distribution. For example, exponential, chi-square, Gaussian, etc. may be used. In addition, a closed form estimator may be used for this analysis. In addition, a Maximum Likelihood Estimator (MLE) is used. The user 106 can therefore be modeled by $$\mu^n, \alpha_t^n, \omega^n, t_{1:i-1}$$

$$t_i^n\ \text{HawkesProces}$$

$$\alpha_t^n\ \text{Gamma}(\alpha_\alpha^n, \beta^n),$$

where parameters $\mu^n, \alpha_t^n, \omega^n, \alpha_\alpha^n, \beta^n$ from log L, which are defined next.

For estimation of parameters of the Hawkes process from which transaction times are drawn, an estimation algorithm may be used. As an example, the Expectation-Maximization algorithm is used to estimate the parameters. In some instances, a simplified form of the EM algorithm may be defined which defines the algorithm without boundary correction. As an initial step, the density function $\lambda(t)$ as $$\lambda(t) = \mu t + \sum_{\forall i: t_i < t} a\omega \exp^{-\omega(t-t_i)}$$

Next, the expectation step updates the elements of the probability matrix (the interpretation of $p_{ij}$ is the probability that the event at time $t_i$ is an offspring of the event at time $t_j$, $p_{ii}$ is the probability of i to be an immigrant.

$$p_{ij} = \frac{a\omega \exp(-\omega(t_i - t_j))}{\mu + L_{j'}^{i-1} a\omega \exp(-\omega(t_i - t_{j'}))}$$

$$p_{ii} = \frac{\mu}{\mu + \Sigma_{j'=1}^{i-1} a\omega \exp(-\omega(t_i - t_{j'}))}$$

with updates to the parameters from the maximization step to $$\mu = \sum_{i=1}^{n} \frac{p_{ii}}{T}$$

$$\alpha = \sum_{i>j} \frac{p_{ij}}{n}$$

$$\omega = \sum_{k>j} \frac{p_{ii}}{(t_i - t_j)p_{ij}}.$$

In an example simulation, the $\mu$, $\alpha$, $\omega$ parameters were initialized to:

$\mu$=0.33n/T ... 0.67n/T $\omega$=0.33n/T ... 0.67n/T $\alpha$=0.25 ... 0.5 s.t.

$\lambda(0)$=An/T $\lambda(\infty)$=Bn/T is satisfied for evenly distributed points, with A and B close to 1.

As indicated, a similar model is defined for the malicious user (secondary user 108), however the model used may not be as rich due to the limited amount of information about the secondary user (e.g., malicious user). In one example, as indicated above, a secondary user 108 may be modelled using a Poisson process with amounts drawn from an exponential distribution. A Poisson process is a stochastic process that can be used to count consecutive events occurring over given time intervals. Note that a Poisson process is used as an exemplary process however the model is not so limited and other processes may be used such as a Bernoulli process.

Similarly, in this example an exponential distribution is used but other distributions may be used. For this example, the secondary user may be modeled as $t_i^n$ PoissonProces($\lambda_t^m, t_{i-1}^m$)

$\alpha_t^n$ Exponential($\lambda_\alpha^m$), where parameters $\lambda_t^m, \lambda_\alpha^m$ are from the prior data acquired (e.g., hierarchical Gamma data), which can be defined as $\lambda_t^m$Gamma($\alpha_t^{hm}, \beta_t^{hm}$), $\lambda_t^m$ Gamma($\alpha_\alpha^{hm}, \beta_t^{hm}$), with hyper-parameters $\alpha_t^{hm}, \beta_t^{hm}, \alpha_\alpha^{hm}, \beta_t^{hm}$ chosen such that the prior data is uninformative (e.g., $\alpha_t^{hm} = \alpha_\alpha^{hm} = 1$ and the interval and amount rate of the secondary user is equivalent to the estimate interval rate at infinity and the amount of the user can be defined as:

$$\beta_t^{hm} = \frac{1 - \alpha_t^n}{\mu_t^n}$$

$$\beta_a^{hm} = \frac{1}{\beta_a^n}$$

Next, with user models defined, methodology 200 continues to the fragmentation of the transactional logs. In particular, once a user's transactional history is analyzed, windowed subsequences of the transaction log are defined as windowed data (a subsequence of L) Wk.J for use in computing the posterior probability 206. Therefore, the transaction log L can be divided into windows of a size sufficient for stable estimation in order to take the rightful parameters as estimates.

For the windows, the detection of malware or occurrence of an account take over can be drawn from a distribution provided a prior probability such that ATO Bernoulli (pATO), where pATO is the prior probability of an ATO occurring in a given window. Note that for reference, when ATO is false (O), all rows in the window are labeled to belong to the user. Additionally, when the ATO is true(I), row labels can be drawn from the Bernoulli distribution with the probability that the multiple users, (e.g., the user and a secondary user) exist in the same window being 0.5 and expressed as li if ATOthenBernoulli(0.S)elseDirac(0), where for every row in the given window, the label (user or secondary user) is drawn from the Bernoulli distribution.

Note that in computing the posterior probability 206, the aim is to infer the posterior probability that the window contains an account take over, given the times and amounts of payments in the window as observations. Therefore, an output 208 is achieved by performing a comparison and used to infer the probability that two users rather than a single user is present and thus, fraudulent activity is likely. For this, drawing distribution parameters, ATO occurrences and labeling and observing times and amounts of payments in the window. The posterior probability can therefore be defined as the sample mean of ATO is true. In some embodiments, the inference may be performed using simulations.

Figure 3A:
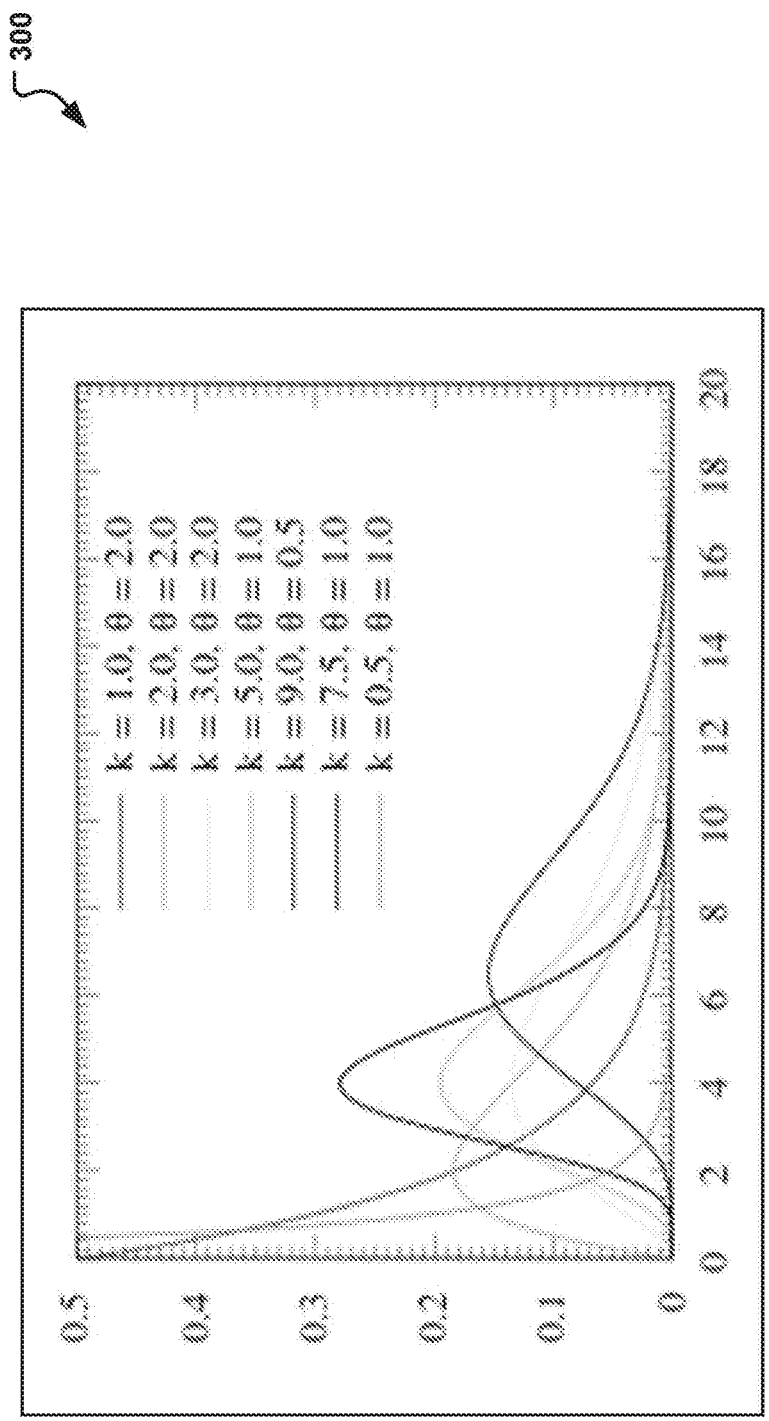
FIG. 3A illustrates a graphical diagram of an exemplary gamma distribution for use in modeling malware detection.
Figure 3B:
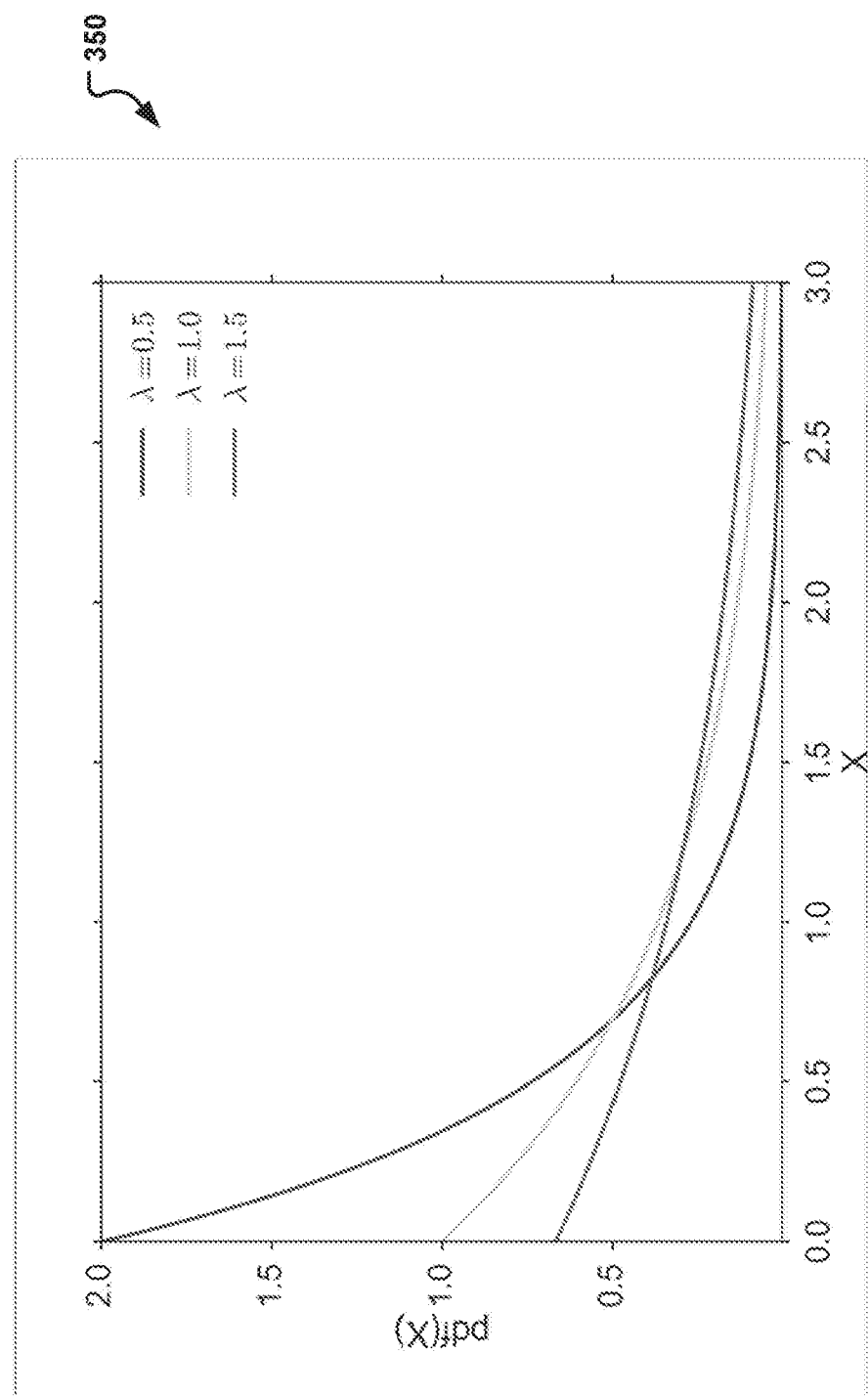
FIG. 3B illustrates a graphical diagram of an exemplary exponential distribution for use in modeling malware detection.

FIGS. 3A-3B are exemplary graphical distributions used for malware detection. In particular, FIG. 3A illustrates a graphical representation of a distribution that can be used with malware detection. FIG. 3B illustrates a graphical representation of another distribution that can be used in modeling malware detection.

FIG. 3A illustrates an exemplary graphical representation of a gamma distribution. As indicated above, gamma distribution may be used to model user 106. The gamma distribution is a continuous probability distribution which uses two parameters, which in this case can include amount and time. The gamma distribution, as illustrated in FIG. 3A, is a flexible distribution which, through scale and shape parameters, can include chi-squared and even the exponential distribution.

FIG. 3B illustrates an exemplary graphical representation of the exponential distribution. The exponential distribution is a less sophisticated distribution which can be used to model for the secondary user 108. As previously indicated, the secondary user 108 transaction information may be more limited than the user 106 transaction information and as such, a simpler model may be used for to describe the events (e.g., timed monetary events) in a Poisson process.

Note that although FIGS. 3A and 3B illustrate a gamma distribution and an exponential distribution respectively, other distributions are possible and the method and system described herein is not so limited.

Figure 4:
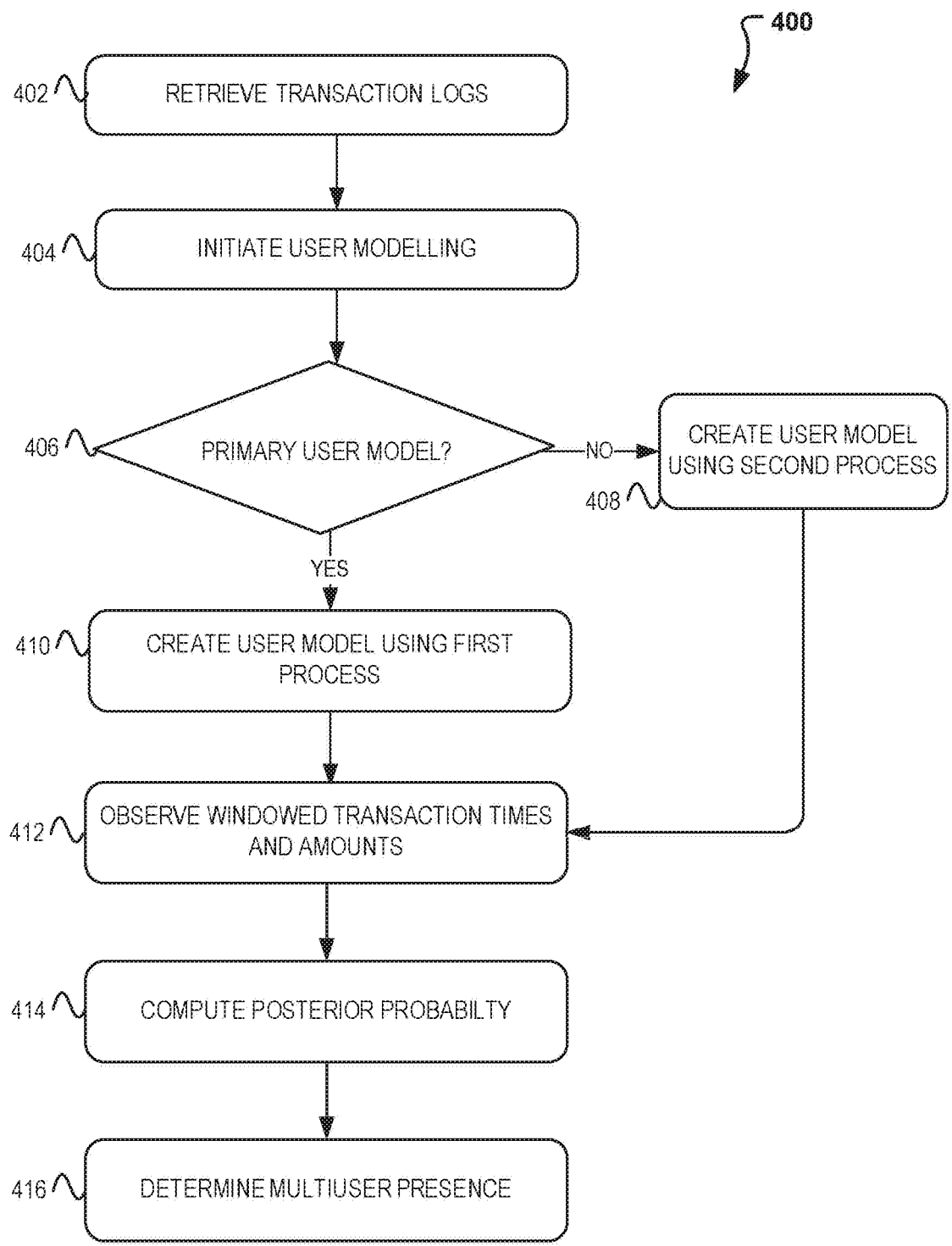
FIG. 4 illustrates a flow diagram illustrating operations for detecting malware account take over.
Figure 5:
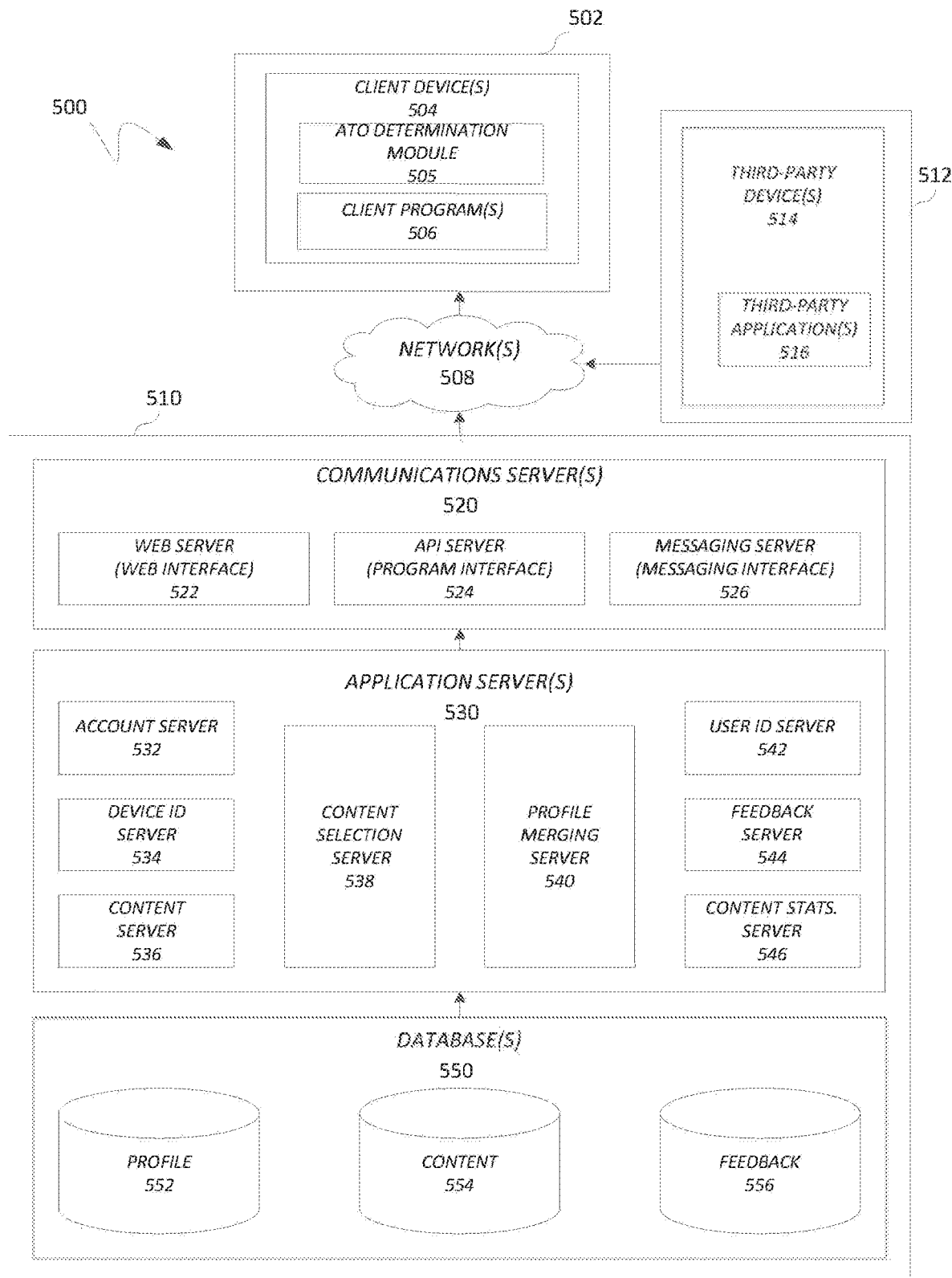
FIG. 5 illustrates a block diagram of a system for detecting malware account take over.

FIG. 4 illustrates example process 300 for malware detection that may be implemented on a system, such as system 500 and device 102 in FIGS. 5 and 1 respectively. In particular, FIG. 4 illustrates a flow diagram illustrating operations for using user transactional log to detect multiple users during a transaction. According to some embodiments, process 400 may include one or more of operations 402-416, which may be implemented, at least in part, in the form of executable code stored on a non-transitory, tangible, machine readable media that, when run on one or more hardware processors, may cause a system to perform one or more of the operations 402-416.

Process 400 may begin with operation 402, where user transaction logs are retrieved. Retrieving user transaction logs includes looking at historical data from the user for initiating user modeling in operation 404. At operation 404, once the transaction logs (historical data) have been retrieved, user information gathered from the logs is modeled for use later in malware detection. In modeling the user, a first decision is made in operation 406 as to whether the model is for the primary user 102 or a secondary/malicious user 108. As previously indicated, a primary user model may be more rich and precise since the information available is greater than that of a secondary user 08. Therefore, if the decision at operation 406 is that the primary user is not being modeled, then method 400 continues to operation 408.

At operation 408, the user model for the secondary user 108 is created. This secondary model may be a more simplified model since the behavior of the secondary user is generally unknown, as the secondary user may be new and not seen before. Therefore, to obtain the parameters of the secondary user, the primary user parameters may be used. For example, in instances where the secondary user is a malicious user, the secondary user may disguise himself as the primary user. Therefore, the secondary user may have similar parameters as those of the primary user. Thus, using primary user parameters in conjunction with Bayesian interference during an online analysis (during the computation of the probability and labeling of ATO) the distribution of the posterior parameters of the secondary user may be obtained. Note that in some instances, the secondary user data/parameters can be expressed by the transactional logs which can be examined and modeled as a sequence of pairs such that transaction log L includes both time and amount information for each transaction. Once the model for the secondary user 108 is completed, the information is sent to operation 412, where it will be used in conjunction with fragmented transaction logs.

Alternatively, if at the decision of operation 406, it is determined that the primary user is being modeled, then method 400 continues to operation 410. At operation 410, the primary user 106 model is created using a first process, which may be distinct from that used for the secondary user 108. Again, with the larger amount of transaction data available for the primary user 106, the richer the model that may be used for modeling user 106. In one example, the primary user 106 may be modeled using a Hawkes Process whose transaction amounts are drawn from a gamma distribution. Once the models are generated for the primary user 106 and/or secondary user 108, then method 400 may continue to operation 412.

At operation 412, where windowed transaction times and amounts are observed. In this operation, small windows or subsequences of transactions are examined and in some instances a primary score may be provided for each user. In addition, the window lengths can be determined during this operation as well as other relevant parameters relevant to the determination of the posterior probability of operation 414. For example, using the primary user and secondary user models, an inference can be made and labels may be added that suggest account take over (ATO). In addition, the two models may be used in determining a probability of the existence of more than one user.

In operation 414, a probabilistic model may be run on the log fragments determined and observed in operation 412 to determine if the transaction looks like one (a legitimate user) or multiple users (legitimate user+a spurious one) acted on the window. That is to say, in operation 414, a posterior probability may be computed to determine if a possible malware account take over took place. The algorithm can output the posterior probability that two users are acting on the window, given the prior probability of attack. Thus, if the probability is sufficiently high, at operation 416, it is determined that multiuse presence existed during that window. In some instances, the primary score computed for each user may be used and/or compared for determining multiuser existence. Thus, past fraudulent activity and compromised to the user account may be caught. In addition, inline usage of such algorithm may be used for real-time validation of the account for the prevention of an ATO. For example, a multiuser existence may include a situation where both a first user and a second user acted on the window. Based on the computed posterior probability, it may be determined that a first user is a legitimate user who should be given authorized access to the account but a second user is an illegitimate user who is performing a malicious account-takeover of the account. When such a determination is made, the process herein may actively take actions to prevent the second user from having access to the account and/or to prevent the second user from conducting transactions. In some embodiments, the actions may involve automatically logging the second user out of the account if the second user was still logged into the account. In some embodiments, the actions may involve denying or rejecting prospective transactions or pending transactions involving the account. For example, prospective or pending transactions that occurred during the multiuser existence window, or at least temporarily suspending these transactions pending further review for potential fraud. In other embodiments, the process herein may notify the first user that his/her account may be the subject of a malicious account takeover, and that the first user may need to change his/her account credentials such as username and password. As such, illegitimate users are prevented from using the account to conduct transactions or otherwise perpetrate fraud.

Note that more or fewer operations may exist in performing method 400. In addition, an operation may exist for labeling transaction data so that the labeling can be projected to session and login level data. This labeling of the session level data and/or login level data may then be later used to train classifiers to detect an increase in the likelihood of an upcoming malicious transaction. In addition, additional parameters (in addition to time and amounts) may be used for the determination. For example, user IP addresses may be considered as well as other parameters that are relevant in modeling the user. Further, these additional parameters may be used in in conjunction with these and other algorithms for learning the probability of the existence of a malicious user(s) from the transaction logs.

In an effort to ensure this system and method presented, preliminary simulations were run to include approximately 5000 logs. The logs were then windowed for evaluation and using posterior probability about 441 attacks were detected. That is to say, the model successfully identified malware ATO driven attacks providing at least a 3× predictive amplification. The probability of discovering an ATO in a reported window is at least three times higher than conventional use of random windows. Therefore, the system and method for detecting malware ATO can be used for determining past and current multiuser account use.

FIG. 5 illustrates, in block diagram format, an example embodiment of a computing environment adapted for implementing a system for queue reduction. As shown, a computing environment 500 may comprise or implement a plurality of servers and/or software components that operate to perform various methodologies in accordance with the described embodiments. Severs may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 4 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing environment 500 may include, among various devices, servers, databases and other elements, one or more clients 502 that may comprise or employ one or more client devices 504, such as a laptop, a mobile computing device, a tablet, a PC, a wearable device, and/or any other computing device having computing and/or communications capabilities in accordance with the described embodiments. Client devices 504 may include a cellular telephone, smart phone, electronic wearable device (e.g., smart watch, virtual reality headset), or other similar mobile devices that a user may carry on or about his or her person and access readily.

Client devices 504 generally may provide one or more client programs 506, such as system programs and application programs to perform various computing and/or communications operations. Some example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APis), and so forth. Some example application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 506 may display various graphical user interfaces (GUis) to present information to and/or receive information from one or more users of client devices 504. In some embodiments, client programs 506 may include one or more applications configured to conduct some or all of the functionalities and/or processes discussed below.

Client device 504 (e.g., device 102) may also include an ATO determination module 505, that can be used in network-based system 510 to detect malware ATO. The ATO determination module 505 may also be used to fragment the user transaction log, model users, label and determine relevant parameters, and run the posterior probability algorithms for malware detection.

As shown, client devices 504 may be communicatively coupled via one or more networks 508 to a network-based system 510. Network-based system 510 may be structured, arranged, and/or configured to allow client 502 to establish one or more communications sessions between network-based system 510 and various computing devices 504 and/or client programs 506. Accordingly, a communications session between client devices 504 and network-based system 510 may involve the unidirectional and/or bidirectional exchange of information and may occur over one or more types of networks 508 depending on the mode of communication. While the embodiment of FIG. 5 illustrates a computing environment 500 deployed in a client-server operating relationship, it is to be understood that other suitable operating environments, relationships, and/or architectures may be used in accordance with the described embodiments.

Data communications between client devices 504 and the network-based system 510 may be sent and received over one or more networks 508 such as the Internet, a WAN, a WWAN, a WLAN, a mobile telephone network, a landline telephone network, personal area network, as well as other suitable networks. For example, client devices 504 may communicate with network-based system 510 over the Internet or other suitable WAN by sending and or receiving information via interaction with a web site, e-mail, IM session, and/or video messaging session. Any of a wide variety of suitable communication types between client devices 504 and system 510 may take place, as will be readily appreciated. In particular, wireless communications of any suitable form may take place between client device 504 and system 510, such as that which often occurs in the case of mobile phones or other personal and/or mobile devices.

In various embodiments, computing environment 500 may include, among other elements, a third party 512, which may comprise or employ third-party devices 514 hosting third-party applications 516. In various implementations, third-party devices 514 and/or third-party applications 516 may host applications associated with or employed by a third party 512. For example, third-party devices 514 and/or third-party applications 516 may enable network-based system 510 to provide client 502 and/or system 510 with additional services and/or information, such as merchant information, data communications, payment services, security functions, customer support, and/or other services, some of which will be discussed in greater detail below. Third-party devices 514 and/or third-party applications 516 may also provide system 510 and/or client 502 with other information and/or services, such as email services and/or information, property transfer and/or handling, purchase services and/or information, and/or other online services and/or information.

In one embodiment, third-party devices 514 may include one or more servers, such as a transaction server that manages and archives transactions. In some embodiments, the third-party devices may include a purchase database that can provide information regarding purchases of different items and/or products. In yet another embodiment, third-party severs 514 may include one or more servers for aggregating consumer data, purchase data, and other statistics.

Network-based system 510 may comprise one or more communications servers 520 to provide suitable interfaces that enable communication using various modes of communication and/or via one or more networks 508. Communications servers 520 may include a web server 522, an API server 524, and/or a messaging server 526 to provide interfaces to one or more application servers 530. Application servers 530 of network-based system 510 may be structured, arranged, and/or configured to provide various online services, merchant identification services, merchant information services, purchasing services, monetary transfers, checkout processing, data gathering, data analysis, and other services to users that access network-based system 510. In various embodiments, client devices 504 and/or third-party devices 514 may communicate with application servers 530 of network-based system 510 via one or more of a web interface provided by web server 522, a programmatic interface provided by API server 524, and/or a messaging interface provided by messaging server 526. It may be appreciated that web server 522, API server 524, and messaging server 526 may be structured, arranged, and/or configured to communicate with various types of client devices 504, third-party devices 514, third-party applications 516, and/or client programs 506 and may interoperate with each other in some implementations.

Web server 522 may be arranged to communicate with web clients and/or applications such as a web browser, web browser toolbar, desktop widget, mobile widget, web-based application, web-based interpreter, virtual machine, mobile applications, and so forth. API server 524 may be arranged to communicate with various client programs 506 and/or a third-party application 516 comprising an implementation of API for network-based system 510. Messaging server 526 may be arranged to communicate with various messaging clients and/or applications such as e-mail, IM, SMS, MMS, telephone, VoIP, video messaging, IRC, and so forth, and messaging server 526 may provide a messaging interface to enable access by client 502 and/or third party 512 to the various services and functions provided by application servers 530.

Application servers 530 of network-based system 510 may be a server that provides various services to clients including, but not limited to, data analysis, geofence management, order processing, checkout processing, and/or the like. Application server 530 of network-based system 510 may provide services to a third party merchants such as real time consumer metric visualizations, real time purchase information, and/or the like. Application servers 530 may include an account server 532, device identification server 534, payment server 536, queue analysis server 538, purchase analysis server 540, geofence server 452, notification server 454, and/or checkout server 546. These servers, which may be in addition to other servers, may be structured and arranged to configure the system for monitoring queues and identifying ways for reducing queue times.

Application servers 530, in turn, may be coupled to and capable of accessing one or more databases 550 including a geofence database 452, an account database 454, transaction database 456, and/or the like. Databases 450 generally may store and maintain various types of information for use by application servers 430 and may comprise or be implemented by various types of computer storage devices (e.g., servers, memory) and/or database structures (e.g., relational, object-oriented, hierarchical, dimensional, network) in accordance with the described embodiments.

Figure 6:
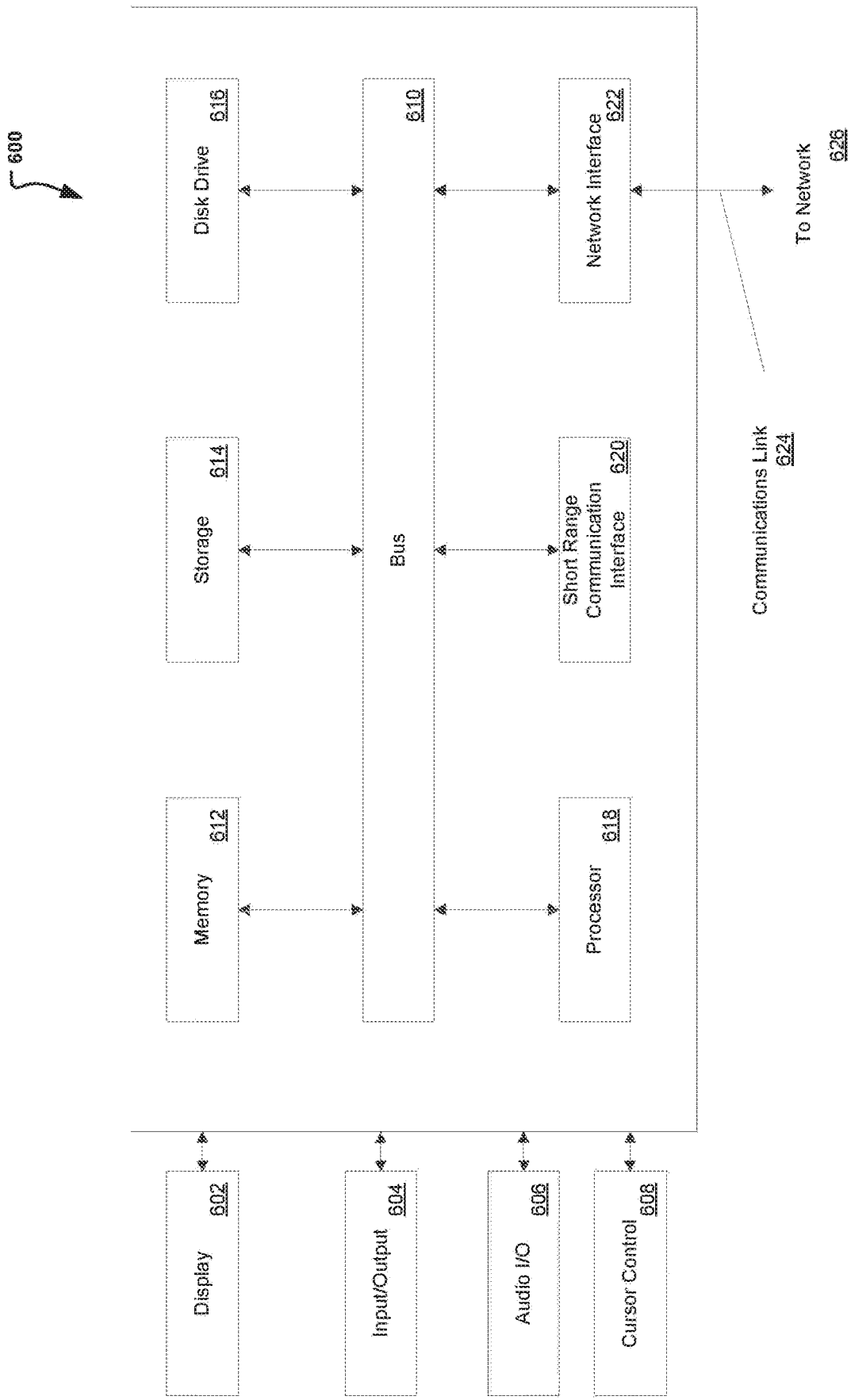
FIG. 6 illustrates an example block diagram of a computer system suitable for implementing one or more devices of the communication systems of FIGS. 1-5.

FIG. 6 illustrates an example computer system 600 in block diagram format suitable for implementing on one or more devices of the system in FIGS. 1-5. In various implementations, a device that includes computer system 600 may comprise a personal computing device (e.g., a smart or mobile device, a computing tablet, a personal computer, laptop, wearable device, PDA, etc.) that is capable of communicating with a network 626. A service provider and/or a content provider may utilize a network computing device (e.g., a network server) capable of communicating with the network. It should be appreciated that each of the devices utilized by users, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a micro-controller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component 614 (e.g., ROM), and/or a disk drive 616. Computer system 600 performs specific operations by processor 618 and other components by executing one or more sequences of instructions contained in system memory component 612 (e.g., for engagement level determination). Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short range communications interface 520. Short range communications interface 620, in various embodiments, may include transceiver circuitry, an antenna, and/or waveguide. Short range communications interface 620 may use one or more short-range wireless communication technologies, protocols, and/or standards (e.g., WiFi, Bluetooth®, Bluetooth Low Energy (BLE), infrared, NFC, etc.).

Short range communications interface 620, in various embodiments, may be configured to detect other devices (e.g., device 102, secondary user device 104, etc.) with short range communications technology near computer system 600. Short range communications interface 620 may create a communication area for detecting other devices with short range communication capabilities. When other devices with short range communications capabilities are placed in the communication area of short range communications interface 620, short range communications interface 620 may detect the other devices and exchange data with the other devices. Short range communications interface 620 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short range communications protocol, such as WiFi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory storing instructions; and
   a processor configured to execute the instructions to cause the system to perform operations comprising:
   receiving a first request to access an account associated with a first user from a first device;
   receiving a second request to access the account associated with the first user from a second device;
   based on the receiving the first request and the receiving the second request, initiating a malware detection check, wherein the malware detection check includes generating a first user transaction model for the first user associated with the first device and a second user transaction model for a second user associated with the second device;
   determining that the second user is an unauthorized user of the account, wherein the determining is based in part on the malware detection check; and
   preventing, based on the determining, the second user from accessing the account, wherein the preventing is performed at least in part by denying or suspending a transaction involving the second user or logging the second user out of the account.

2. The system of claim 1, wherein the malware detection check further includes retrieving an activity log of the first user for the first device and comparing the activity log to the first and second user transactional models generated.

3. The system of claim 2, wherein the activity log is a fragment of a total activity log, and
   wherein the fragment of the total activity log is determined using a windowing scheme.

4. The system of claim 3, wherein the windowing scheme includes determining a window length and a window for selecting the fragment of the total activity log.

5. The system of claim 1, wherein the malware detection check further includes determining a probability distribution for multiuser access.

6. The system of claim 1, wherein determining the second user is the unauthorized user is based on a comparison and an inference of a probability that two users are accessing the account.

7. The system of claim 1, wherein the determining further comprises determining that the unauthorized user is attempting an account takeover of the account.

8. The system of claim 1, wherein the operations further comprise notifying the first user that an unauthorized attempt to access the account has occurred.

9. A method comprising:
receiving, by an electronic server, a first request to access an account associated with a first user from a first device;
receiving, by the electronic server, a second request to access the account from a second device;
after the first request and the second request have been received, initiating, by the electronic server, a malware detection check, wherein the malware detection check includes accessing a first user transaction model for the first user associated with the first device and a second user transaction model for a second user associated with the second device;
determining, by the electronic server, that the second user is an unauthorized user of the account, wherein the determining is based in part on the malware detection check; and
based on the determining, denying or suspending a transaction involving the second user or logging the second user out of the account, wherein the denying or suspending or the logging the second user out of the account are performed by the electronic server.

10. The method of claim 9, wherein the malware detection check further includes retrieving an activity log of the first user for the first device and comparing the activity log to the first and second user transactional models generated.

11. The method of claim 10, wherein the activity log is a fragment of a total activity log, and
wherein the fragment of the total activity log is determined using a windowing scheme.

12. The method of claim 11, wherein the windowing scheme includes determining a window length and a window for selecting the fragment of the total activity log.

13. The method of claim 9, wherein the malware detection check is performed at least in part by determining a probability distribution for multiuser access.

14. The method of claim 9, wherein determining the second user is the unauthorized user is based on an inference of a probability that two different users are accessing the account.

15. The method of claim 9, wherein the determining further comprises determining that the unauthorized user is attempting an account takeover of the account.

16. The method of claim 9, further comprising notifying the first user that an unauthorized attempt to access the account has occurred.

17. A non-transitory machine-readable medium having stored thereon machine-readable instructions executable to cause a machine to perform operations comprising:
receiving, from a first device, a first request to access an account;
receiving, from a second device, a second request to access the account;
based on the first request and the second request, initiating a malware detection check, wherein the malware detection check includes generating a first user transaction model for a first user associated with the first device and a second user transaction model for a second user associated with the second device;
determining, based at least in part on the malware detection check, that the first user and the second user are different users and that at least one of the first user or the second user is an unauthorized user; and
preventing, based on the determining, the unauthorized user from accessing the account, wherein the preventing is performed at least in part by denying or suspending transactions involving the unauthorized user or logging the unauthorized user out of the account.

18. The non-transitory machine-readable medium of claim 17, wherein the malware detection check further includes retrieving an activity log of the first user for the first device, and
comparing the activity log to the first and second user transactional models generated.

19. The non-transitory machine-readable medium of claim 18, wherein the activity log is a fragment of a total activity log, and wherein the fragment of the total activity log is determined using a windowing scheme.

20. The non-transitory machine-readable medium of claim 19, wherein the windowing scheme includes determining a window length and a window for selecting the fragment of the total activity log.

\* \* \* \* \*